(12) United States Patent
Gollier

(10) Patent No.: US 7,997,735 B2
(45) Date of Patent: Aug. 16, 2011

(54) SYSTEMS AND METHODS FOR SPECKLE REDUCTION

(75) Inventor: Jacques Gollier, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 720 days.

(21) Appl. No.: 12/079,613

(22) Filed: Mar. 27, 2008

(65) Prior Publication Data
US 2009/0244684 A1 Oct. 1, 2009

(51) Int. Cl.
G03B 21/26 (2006.01)
G02B 5/02 (2006.01)

(52) U.S. Cl. .......................................... 353/30; 359/599

(58) Field of Classification Search .................. 359/278, 359/599; 353/20, 98, 121
See application file for complete search history.

(56) References Cited

U.S. PATENT DOCUMENTS

| | | | |
|---|---|---|---|
| 5,313,479 A | 5/1994 | Florence | 372/26 |
| 6,081,381 A | 6/2000 | Shalapenok et al. | 359/619 |
| 6,154,259 A | 11/2000 | Hargis et al. | 348/756 |
| 6,323,984 B1 | 11/2001 | Trisnadi | 359/245 |
| 6,577,429 B1 | 6/2003 | Kurtz et al. | 359/279 |
| 6,594,090 B2 | 7/2003 | Krushwitz et al. | 359/707 |
| 6,738,105 B1 | 5/2004 | Hannah et al. | 348/745 |
| 6,747,781 B2 | 6/2004 | Trisnadi | 359/279 |
| 6,863,216 B2 | 3/2005 | Tsikos et al. | 235/462.01 |
| 6,870,650 B2 | 3/2005 | Kappel et al. | 359/15 |
| 6,874,893 B2 | 4/2005 | Park | 353/84 |
| 2006/0001780 A1 | 1/2006 | Ahn et al. | 348/744 |
| 2006/0033009 A1 | 2/2006 | Kobayashi et al. | |
| 2006/0109553 A1 | 5/2006 | Serafimovich et al. | 359/565 |
| 2006/0238743 A1 | 10/2006 | Lizotte et al. | 356/28.5 |
| 2006/0250352 A1 | 11/2006 | Fairs et al. | 345/156 |
| 2008/0212040 A1 * | 9/2008 | Aksyuk | 353/99 |

FOREIGN PATENT DOCUMENTS

| | | |
|---|---|---|
| WO | WO2005/041423 | 5/2005 |
| WO | WO2005/062114 | 7/2005 |
| WO | WO2006/137326 | 12/2006 |

OTHER PUBLICATIONS

Wang et al.; "Speckle Reduction in Laser Projection Systems by Difractive Optical Elements"; Applied Optics, Optical Society of America; Vo. 37, No. 10; 1998; pp. 1770-1775.
Goodman; "Some Fundamental Properties of Speckle"; Journal of Optical Society of America; Vo. 66, No. 11; 1976; pp. 1145-1150.
"A Practical Laser Projector with new Illumination Optics for Reduction of Speckle Noise", K. Kasazumi, et al Japanese journal of Applied Physics, vol. 43, No. 8B 2004 pp. 5904-5906.
"Hadamard speckle contrast reduction", Optics Letters, vol. 29, No. 1, pp. 11-13 Jan. 1, 2004.

* cited by examiner

*Primary Examiner* — Thanh X Luu
*Assistant Examiner* — Danell L Owens
(74) *Attorney, Agent, or Firm* — Kwadjo Adusei-Poku

(57) ABSTRACT

A laser projection system including a system controller, a visible light source, and a light disrupting element is provided. The visible light source includes at least one laser and the laser projection system is programmed to scan a scanned optical signal of the visible light source across a plurality of image pixels. The scanned optical signal comprises a low spatial frequency beam and a high spatial frequency beam, and the low spatial frequency beam generates a low spatial frequency image having spatial frequencies below a spatial frequency threshold, the high spatial frequency beam generates a high spatial frequency image having spatial frequencies that are above the spatial frequency threshold, and the scanned laser image is a sum of the high spatial frequency image and the low spatial frequency image. The low spatial frequency beam is altered by an out of focus light disrupting element.

24 Claims, 5 Drawing Sheets

SYSTEMS AND METHODS FOR SPECKLE REDUCTION

BACKGROUND OF THE INVENTION

The present invention relates to systems and methods for reducing speckle in a scanned image. More specifically, the present invention relates to the design and methods of operation of a visible light source and laser projection system to reduce the presence of speckle that may be visible in a laser projection image. Speckle that is present in the image may seriously degrade the image quality. Speckle may result whenever a coherent light source is used to illuminate a rough surface, for example, a screen, or any other object that produces a diffused reflection or transmission.

Particularly, a multitude of small areas of the screen or other reflecting object scatter light into a multitude of reflected beams with different points of origination and different propagation directions. At an observation point, for example in the observer's eye or at the sensor of a camera, these beams may interfere constructively to form a bright spot, or destructively to form a dark spot, producing a random granular intensity pattern known as speckle. Speckle may be characterized by the grain size and contrast, usually defined as a ratio of standard deviation to mean light intensity in the observation plane. For a large enough illuminated area and a small enough individual scattering point size, the speckle will be "fully developed," with a brightness standard deviation of 100%. For example, if an image is formed on the screen using laser beams, such granular structure will represent noise, or a serious degradation of the image quality.

The general concept of using diffusers to minimize speckle consists of projecting an intermediate image over a small sized diffusing surface, and using projection optics to project that intermediate image over the final screen. By moving the small size diffuser, the phase of the electric field is scrambled over time, which results in changing the perceived speckle pattern. If the diffuser is moving fast enough, the perceived speckle pattern changes at high frequencies and are averaged in time by the eye. To work efficiently, multiple speckle frames need to be created over the integration time of the eye, which is typically in the order of 50 Hz. This concept can easily be applied to projection systems that display images on a frame-per-frame basis.

However, it is much more difficult to incorporate a diffuser to reduce the perceived speckle in a laser scanning projector system because the scanned spot is moving extremely fast and stays at approximately the same location over durations in the order of 40 nS. It is very difficult to display multiple speckle patterns over such a small duration because the maximum speed at which different speckle patterns can be displayed is the frequency at which full frames are being displayed.

BRIEF SUMMARY OF THE INVENTION

According to one embodiment, a laser projection system including a system controller, a visible light source, and a light disrupting element is provided. The laser projection system is programmed to generate at least a portion of a scanned laser image by operating the laser for optical emission of encoded image data and controlling a scanning element to scan an optical signal of the visible light source across a plurality of image pixels. The scanned optical signal comprises a low spatial frequency beam and a high spatial frequency beam, such that the low spatial frequency beam generates a low spatial frequency image having spatial frequencies below a spatial frequency threshold, the high spatial frequency beam generates a high spatial frequency image having spatial frequencies that are above the spatial frequency threshold. The scanned laser image is a sum of the high spatial frequency image and the low spatial frequency image The laser project system is programmed to alter the low spatial frequency beam by directing and focusing the low spatial frequency beam upon an out of focus light disrupting element, wherein the light disrupting element is out of focus with respect to an intermediate image that is formed by scanning and focusing the low spatial frequency beam.

According to another embodiment, a method of controlling a laser projection system comprising a visible light source having at least one laser and a light disrupting element is provided. The method includes generating at least a portion of a scanned laser image by configuring the at least one laser for optical emission of encoded image data and controlling a scanning element to scan an output beam of the visible light source across a plurality of image pixels. The scanned optical signal comprises a low spatial frequency beam and a high spatial frequency beam. The low spatial frequency beam generates a low spatial frequency image having spatial frequencies below a spatial frequency threshold and the high spatial frequency beam generates a high spatial frequency image having spatial frequencies that are above the spatial frequency threshold. The method further includes selectively disrupting the low spatial frequency beam by directing the low spatial frequency beam upon an out of focus light disrupting element, wherein the light disrupting element is out of focus with respect to an intermediate image that is formed by scanning and focusing the low spatial frequency beam.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

Figure 1:
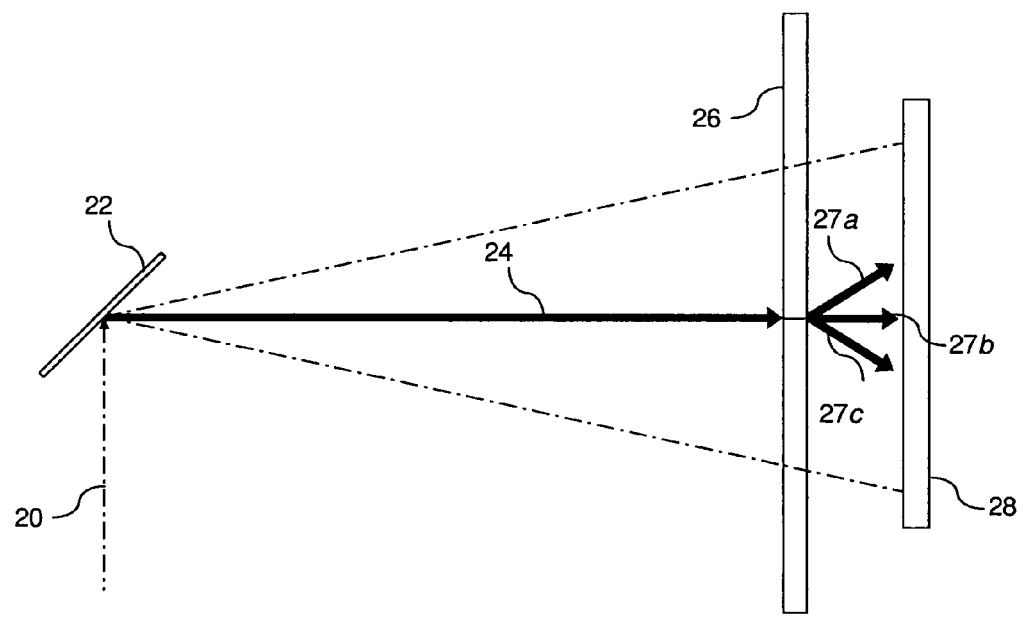
FIG. 1 is a schematic illustration of a speckle reduction configuration.

The embodiments set forth in the drawings are illustrative in nature and are not intended to be limiting of the invention defined by the claims. Moreover, individual features of the drawings and the invention will be more fully apparent and understood in view of the detailed description.

DETAILED DESCRIPTION

Generally, the present inventors have recognized that placing a light disrupting element within the path of a laser that is being scanned onto a projection surface aid in eliminating speckle that is visible to a human eye or detector. More specifically, embodiments of the present invention utilize the concept of a diffusing surface but, instead of moving the diffuser extremely fast, the embodiments take advantage of the fact that, in a laser scanning projection system, the spot is moving extremely fast. To fully understand the operations of the particular embodiments, it may be helpful to review technical information regarding scanned laser sources and light disrupting surfaces, and their relationship to speckle in a scanned laser image.

For illustrative purposes, the general concept of using an out of focus diffusing or diffracting surface in a laser scanning projection system 10 is illustrated in FIG. 1. In the particular illustration, an optical signal 20, which may be generated by a laser, is emitted upon a scanning mirror 22. The scanning mirror 22 then scans the optical signal 20 in two directions upon a projection surface or screen 28, thereby forming an image. To eliminate speckle in the image, a light disrupting element 26 may be placed within the path of the scanned optical signal 24 and at a relatively close distance to the projection surface 28. The light disrupting element 26 may comprise a diffracting optical element or a diffusing optical element, for example. The light disrupting element 26 then scatters the incoming scanned optical signal 24 into several scattered components (e.g., 27a, 27b, and 27c). As such, for each position of the scanned optical signal upon the light disrupting element 26, a new speckle pattern is generated over the projection surface 28, resulting in the shape of the speckle changing at extremely high speeds. These patterns are then averaged on the projection surface 28, minimizing the appearance of speckle.

Although the light disrupting element 26 and configuration of FIG. 1 may reduce speckle in the scanned laser image, because the light disrupting element 26 is located at a certain distance from the projection surface 28, the image is blurred. The amplitude of the blurring is a function of the distance and scattering angle of the light disrupting element 26. Additionally, the light disrupting element 26 generates low spatial frequency, nonhomogeneous illumination that is inherently linked to the surface of the light disrupting element 26. Although this nonhomogeneous illumination is not equivalent to speckle, it is predictable and may be observed regardless of the position of the observer.

Figure 2:
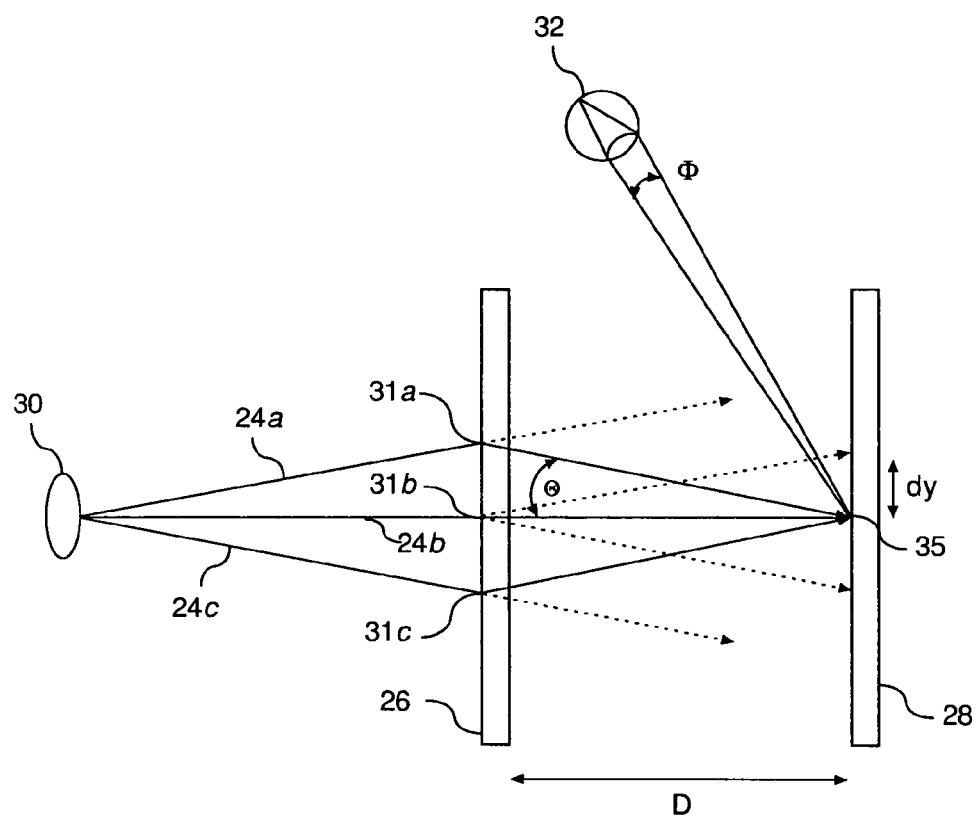
FIG. 2 is a schematic illustration of a speckle reduction configuration.

As an example and not a limitation, FIG. 2 further illustrates the use of a diffracting element as the light disrupting element 26 to reduce speckle in a scanned laser image, and also illustrates the effects of the distance of the diffracting element 26 to the projection surface 28, the angle of the eye or detection device Φ, and the angle between the orders of diffraction θ. In the simplified illustration of FIG. 2, a diffracting optical element 26 having N diffraction orders is used to minimize speckle. For the purpose of clarity, three orders of diffraction (0, −1, and +1) are used as an example. For other more complex diffracting elements, the diffraction angle θ should be replaced by the angle in which the light is scattered.

As illustrated, the optical signal 20 is two dimensionally scanned upon the diffracting optical element 26 by a scanning element 30, as represented by scanned optical signals 24a, 24b, and 24c. These scanned optical signals 24a-c reach the diffracting optical element 26 at representative points 31a, 31b, and 31c, respectively. The exemplary point 35 on the projection surface 28 is illuminated by three different rays originating from points 31a, 31b, and 31c on the diffracting optical element 26. By illuminating point 35 as well as other points on the projection surface 28 at different incidence angles, three speckle patterns are generated. The three patterns that are generated are identical to one another except that they are angularly shifted by an angle equal to twice the diffraction order angle θ, which is the angle between the diffraction orders of the diffracting optical element 26.

To fully minimize the appearance of speckle, the three patterns that are generated and perceived by a human eye must be uncorrelated. Two conditions should be met to ensure that the patterns are uncorrelated. First, the diffraction order angle θ should be greater than or equal to one half of the eye pupil angle Φ, which is the angle defined by an eye or sensor 32:

$$\theta \geq \frac{\Phi}{2}, \qquad (1.1)$$

where θ is the diffraction order angle of the diffracting optical element and Φ is the eye pupil angle.

Second, the spatial separation dy between the diffraction orders should be larger than the beam spot diameter, such that:

$$dy = D^* \tan(\theta) \geq S, \qquad (1.2)$$

where dy is the spatial separation between diffraction orders, D is the distance between the diffracting optical element and the projection surface, θ is the diffraction order angle of the diffracting optical element; and S is the spot diameter created by the optical signal.

Equations 1.1 and 1.2 provide the minimum diffracting distance D and diffraction order angle θ that should be met to eliminate speckle. However, the distance from the diffracting optical element 26 to the projection surface 28 and the diffraction order angle θ should be as small as possible to minimize image blurring and keep the depth of focus. Therefore, replacing the inequality sign in equations 1.1 and 1.2 provide an ideal system that minimizes speckle without losing too much in image resolution and depth of focus.

Although the optical design illustrated in FIG. 2 minimizes the appearance of speckle, requiring that the light diffusing element 26 be so close to the projection surface 28 presents practical problems. For example, requiring a user of a laser projection system to place a diffusing optical element 26 a set distance from the projection surface 28 each time he or she desires to project an image would be very burdensome and time consuming.

Figure 3:
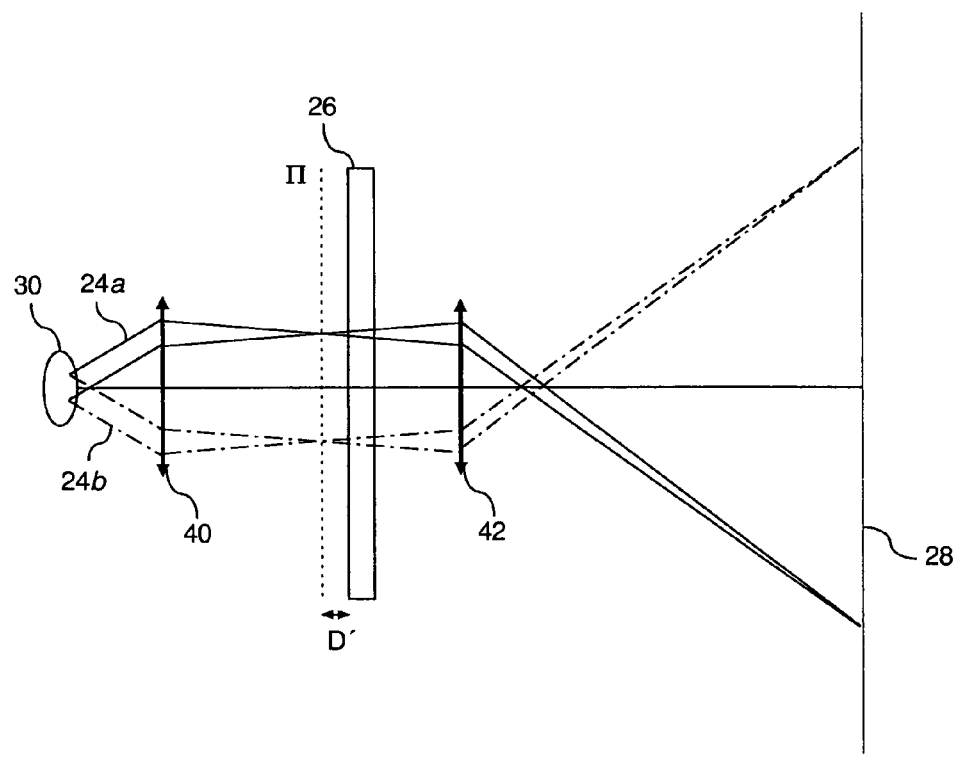
FIG. 3 is a schematic illustration of a speckle reduction configuration.

The present inventors have recognized that generating an out of focus and smaller intermediate image closer to the laser source and scanning element may also reduce speckle. FIG. 3 illustrates the general concept of forming an intermediate image in a plane Π that is located at a distance D' from a light disrupting element 26, which may be a diffusing or diffracting element. The light disrupting element 26 is thereby placed slightly out of focus from the intermediate image. In the illustration of FIG. 3, a scanning element 30 two dimensionally scans an optical signal 20, as represented by scanned optical signals 24a and 24b. A first telecentric lens 40 creates the intermediate image in plane Π. The scanned optical signals (e.g., 24a and 24b) pass through the light disrupting element 26, which diffuses or diffracts the scanned optical signals 24a, 24b. A projection lens 42 then re-images the intermediate image onto the projection surface 28. Taking equation's 1.1 and 1.2, along with paraxial approximations, the parameters of such an illustrative system may be deduced from the following equations:

$$\theta' = \frac{M \times \Phi}{2}, \qquad (1.3)$$

$$D' = \frac{2 \times S \times \Phi}{M^2}, \qquad (1.4)$$

where θ' is the diffraction order angle, D' is the distance of the plane Π from light disrupting element, M is the magnification factor of the projection lens, and S is the spot diameter created by the optical signal.

Although the above illustrative configurations may minimize the appearance of speckle in a scanned laser image, the illustrations described above sacrifice image quality and depth of focus. By disrupting the scanned optical signal and the entire scanned laser image with an out of focus light disrupting element 26, the scanned laser image will appear blurred. The blurring effect is due to the fact that the scanning beam is no longer focused on the screen and the size of the spot that is generating the image is two times the spatial separation dy between diffraction orders. As a consequence, the maximum image resolution is equal to two times the spatial separation dy.

According to some embodiments of the present invention, only those portions of the scanned optical signal corresponding to the portions or areas of the scanned laser image that comprises spatial frequencies that are below a spatial frequency threshold are disrupted. Typical images are made of the sum of a low spatial frequencies where image blurring is not an issue and high spatial frequencies where blurring is not allowed. The optical signal may be selectively split into a low spatial frequency beam or a high spatial frequency beam based on whether the scanned laser image comprises spatial frequencies that are below or above the spatial frequency threshold. The present inventors have recognized that in a scanned laser image, the speckling phenomenon is most prominent in portions of the scanned laser image that possess low spatial frequencies (i.e., spatial frequencies below a spatial frequency threshold), and speckle is not significantly visible in portions of the scanned laser image that possess high spatial frequencies (i.e., spatial frequencies above a spatial frequency threshold). By splitting the optical signal into two beams traveling two optical paths, or using separate laser sources to produce two beams, one containing an out of focus diffusing or diffracting surface and the other one containing no diffusing or diffracting surface, embodiments may generate two different beams, one being speckle free an low resolution and the other one being without speckle compensation for high spatial resolution. The spatial frequency threshold may depend on the optical configuration, which may be close to the blurring frequency (½dy). By employing modulation methods, the relative power between the two beams may be adjusted to locally adjust the power that is needed in the low spatial frequency and the one that is needed in the high spatial frequency of the image.

A component of the optical signal corresponding to a portion of the scanned laser image comprising low spatial frequencies may be directed to a light disrupting element where the component is disrupted or blurred, thereby removing speckle in the scanned laser image. By disrupting only the portions of the image corresponding to relatively low spatial frequencies (i.e., the low spatial frequency image), and transmitting the portions of the image corresponding to relatively high spatial frequencies (i.e., the high spatial frequency image) without disruption, speckle is reduced while preserving image quality (i.e., the image is not blurred). To further avoid image blurring resulting from the out of focus light disrupting element, the ratio between light that is disrupted and light that is transmitted without disruption may be continuously adjusted.

Figure 4:
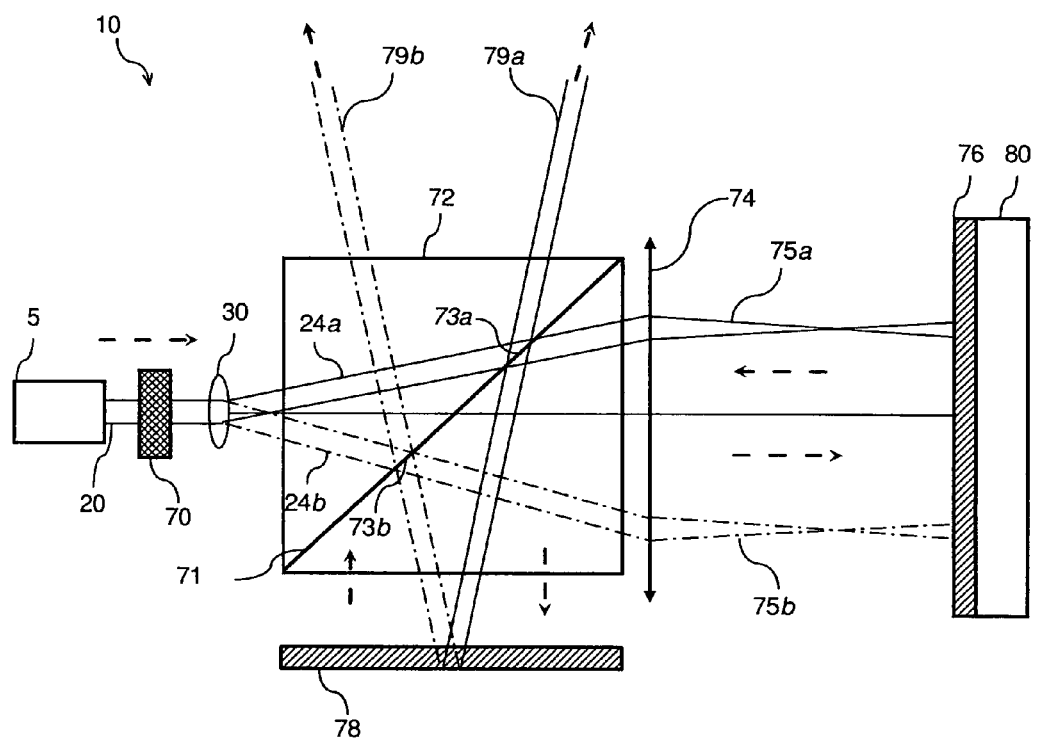
FIG. 4 is schematic illustration of a laser projection system according to one embodiment of the present invention.

Referring now to FIG. 4, an exemplary embodiment of a laser projection system 10 that provides for a compact package, preserved depth of focus and minimized image blurring is illustrated. According to the illustrated embodiment, the laser projection system 10 is programmed so that a visible light source, which may comprise at least one laser 5, generates an optical signal 20 that is scanned across a plurality of pixels, thereby forming an image on the projection surface 28 (not shown). The optical signal 20 may comprise several colors and be generated by several lasers. For example, one laser may generate a red beam, another may generate a blue beam and another may generated a green beam. The scanning element 30 is programmed to scan the optical signal 20 in two dimensions, as represented by scanned optical signals 24a and 24b.

According to the embodiment illustrated in FIG. 4, a polarizing beam splitter 72 may be utilized to split the scanned optical signal 24 (as represented by 24a and 24b) into a low spatial frequency beam 75a or 75b that is directed toward the light disrupting element 80, and a high spatial frequency beam 79a or 79b that is directed toward the projection surface 28. The light disrupting element 26 may be configured as a passive optical element 80 that passively disrupts light directed upon it. The passive optical element 80 may comprise a diffusing optical element or a diffracting optical element that is configured to scatter light, for example.

The power of the beams directed toward the projection surface 28 and toward the passive optical element 80 may be continuously adjusted by controlling a polarization modulator 70 (e.g., an electro-optic modulator) positioned within the path of the optical signal 20 before the scanning element 30. When the scanned optical signal 24 corresponds to portions of the scanned laser image comprising spatial frequencies below the spatial frequency threshold, where speckle is most visible, the polarization modulator 70 may modulate the optical signal 20 between a first polarization state and a second polarization state such that the two polarization states are orthogonal. When the optical signal 24 has a polarization state associated with content of the image having spatial frequencies above the spatial frequency threshold, it is reflected off of the polarizing beam splitter 72 (a component of scanned optical signal 24a is reflected at point 73a as high spatial frequency beam 79a, while a component of scanned optical signal 24b is reflected at point 73b as high spatial frequency beam 79b) toward the projection surface 28 in a path that does not comprise the passive optical element 80. Conversely, when the optical signal 24 has a polarization state associated with content of the image having spatial frequencies below the spatial frequency threshold is transmitted through the polarizing beam splitter 72 (the scanned optical signal 24a is transmitted at point 73a as low spatial frequency beam 75a, while a component of scanned optical signal 24b is transmitted at point 73b as low spatial frequency beam 75b) toward the passive optical element 80. To illustrate this concept, an image $I_o(x,y)$ that can be decomposed into the sum of a low frequency image $I_{lf}(x,y)$ and of a high frequency image $I_{hf}(x,y)$. In that case, the laser is modulated with an amplitude proportional to $I_o$ and the polarization modulator is splitting the beam into the two optical paths in such a way that the ratio $I_{lf}/I_{hf}$ is guaranteed.

Because the green beam within the optical signal 20 is commonly responsible for most of the speckle in a scanned laser image, the polarization modulator 70 may be placed in the path of only the green laser beam prior to the color combination of the red, green and blue beams. Therefore, in some embodiments, only the green beam of the optical signal 20 enters the polarization modulator 70. Alternatively, a dichroic beam splitter may be used in conjunction with the polarizing beam splitter 72 so that red and blue beams are reflected off of the beam splitting surface 71 independent of polarization (reflected off of the dichroic beam splitter), while portions of the green beam are transmitted and reflected as a function of polarization.

For example, if only the green beam is modulated, the green beam that has one polarization state is reflected off of the beam splitting surface 71 while the green beam that has the other polarization state is transmitted through the beam splitting surface. The ratio between the light that is disrupted by the passive optical element 80 and the light that is transmitted without disruption may be continuously adjusted by controlling the level of modulation provided by the polarization modulator 70. The polarization of the optical signal 20 may be modulated such that x % of the scanned optical signal 24 is directed toward the passive optical element 80 and (1−x) % of the scanned optical signal is directed toward the projection surface 28. The laser projection system 10 is programmed such that when speckle is not an issue in the scanned laser image, or if depth of focus is a large concern, the light disrupting feature may be disabled by causing the polarization modulator 70 to be inactive so that 0% of the scanned optical signal is directed to the passive optical element 80.

The laser projection system 10 may also comprise a lens 74 and two quarter wave plates 76, 78. The low spatial frequency beam 75a, 75b may be imaged by the lens 74 toward the passive optical element 80, which disrupts the low spatial frequency beam 75a, 75b by either diffusion and/or diffraction. The resulting disrupted low spatial frequency beam 75a, 75b is reflected off of the passive optical element 80 back toward the polarizing beam splitter 72. A first quarter wave plate 76 is inserted in the path of the disrupted low spatial frequency beam 75a, 75b so that the polarization of the disrupted low spatial frequency beam 75a, 75b is rotated. The disrupted low spatial frequency beam 75a, 75b is then reflected off of the polarizing beam splitter 72 toward a second quarter wave plate 78, which again rotates the polarization of the disrupted low spatial frequency beam and reflects the disrupted low spatial frequency beam back toward the polarizing beam splitter 72. The disrupted low spatial frequency beam is then recombined with the high spatial frequency beam 79a, 79b in the polarizing beam splitter 72, and transmitted through the polarizing beam splitter 72 toward the projection surface 28. In this way, light may be split into two different paths, with a portion being disrupted and a portion not disrupted.

It should be noted that while FIG. 4 illustrates an embodiment where a transmitted beam is disrupted and a reflected component is not disrupted, other embodiments may include a laser projection system 10 in which a beam that is reflected off of the beam splitting surface 71 is disrupted and a beam that is transmitted through the beam splitting surface 71 is not disrupted. Additionally, other embodiments may utilize two lasers to generate a similar color. One laser generates the low spatial frequency beam while the other laser generates the high spatial frequency beam. In this regard, the polarization modulator 70 and polarizing beam splitter 72 are not required. Particularly, rather than using one laser source of one color, and using a modulator to split the light between the low and high spatial frequencies, other embodiments may use two separate laser sources having orthogonal polarizations. These sources may be controlled to create the respective low and high spatial frequency content of the image.

Figure 5:
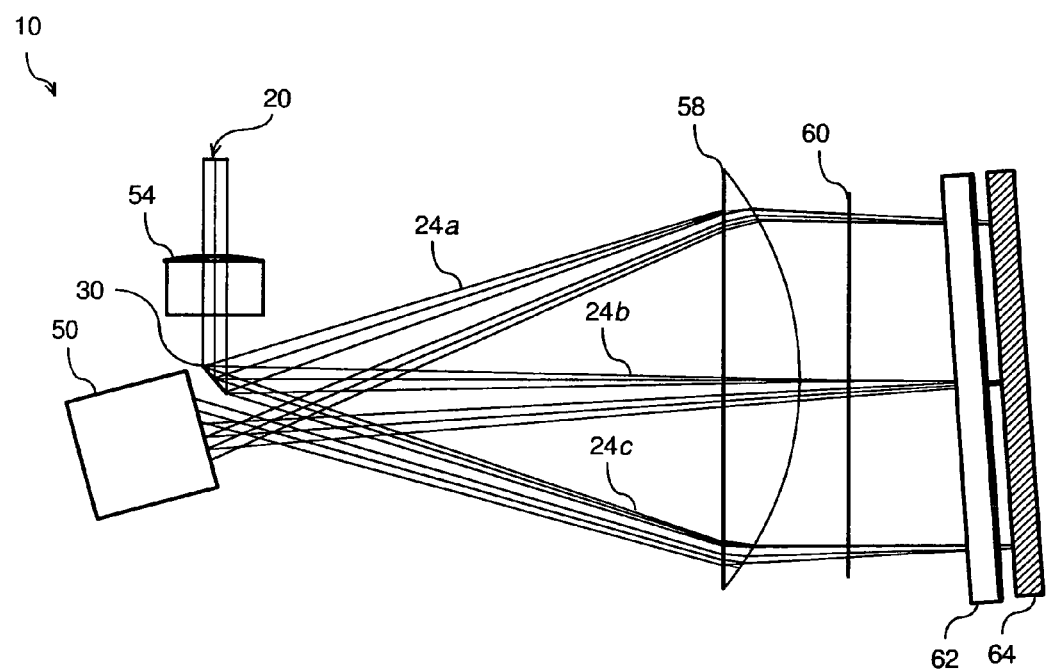
FIG. 5 is a schematic illustration of a laser projection system according to one embodiment of the present invention.

FIG. 5 illustrates an embodiment in which the light disrupting element 26 comprises a two dimensional spatial light modulator 64 rather than a passive optical element 80. The spatial light modulator 64 may be configured to locally disrupt portions of the scanned optical signal 20 that correspond to portions of the scanned optical image that comprise spatial frequencies that are below the spatial frequency threshold. The spatial light modulator 64 may comprise a plurality of modulating pixels that may be reconfigured depending on the spatial frequency content of the scanned laser image.

The spatial light modulator 64 may be programmed to make pixels be locally transparent where spatial frequencies above the spatial frequency threshold are required (i.e., the high spatial frequency image), and make pixels be disruptive (e.g., diffractive or diffusive) where the image presents mostly spatial frequencies that are below the spatial frequency threshold (i.e., the low spatial frequency image). For example, if a scanned laser image is of an object that has a bright edge and thus relatively higher spatial frequencies, the pixels of the spatial light modulator 64 corresponding to the bright edge of the object may be configured so that they are locally transparent. On the other hand, if the object or portions of the object in the image require relatively lower spatial frequencies, the pixels of the spatial light modulator 64 corresponding to the area of the object having relatively lower spatial frequencies may be configured so that they locally disruptive.

Many configurations and variations of spatial light modulators 64 are possible. According to one embodiment, the spatial light modulator 64 may be configured as a phase spatial light modulator 64 that can locally change the phase of light and can, therefore, create reconfigurable holograms generating controlled diffraction orders. Particularly, the phase spatial light modulator 64 may selectively and locally disrupt portions of the scanned optical signal 24 by altering or switching the phase of individual pixels so that when the optical signal 24 is scanned across a phase altering pixel, the phase of that portion of the scanned optical signal that is reflected off of the phase altering pixel is altered or switched. In such a manner, individual pixels may be addressed.

As illustrated in FIG. 5, an optical signal 20 generated by at least one laser (not shown) is scanned by scanning element 30. The optical signal 20 may comprise three nearly collimated beams, which may include a red beam, a blue beam and a green beam. In one embodiment, the laser projection system may further comprise a focusing lens that converges the collimated beams upon the scanning element 30. The scanning element 30 may comprise a device capable of scanning the optical signal 20 such as a scanning mirror or a MEMS. The optical signal 20 is then scanned or deviated in two directions by the scanning element 30, thereby forming scanned optical signal as represented by 24a-c. A field lens 58 may be positioned in the path of the scanned optical signal and correct for field curvature, as well as make the scanned optical signals 24a-c parallel to one another. According to the embodiment illustrated in FIG. 5, the scanned optical signal 24a-c is separated into at least two optical paths by the use of a dichroic mirror 62, which reflects the red and blue beams while permitting the green beam to pass through. An intermediate image 60 is formed at a distance from the dichroic mirror 62 and spatial light modulator 64.

After passing through the dichroic mirror 62, the green beam is scanned upon the two dimensional spatial light modulator 64, which locally disrupts the green beam of the scanned optical signal 24a-c. As described above, the spatial light modulator 64 may be programmed to locally disrupt light transmitted through pixels in portions of the scanned laser image that comprise the high spatial frequency image. The spatial light modulator 64 reflects the green beam, which again passes through the dichroic mirror. Only those pixels corresponding to spatial frequencies comprise the low spatial frequency image disrupt the green beam. However, when the green beam corresponds to pixels representing content of the scanned laser image having spatial frequencies that are above the spatial frequency threshold, the pixels simply reflect the green beam without disruption. As described herein, the spatial light modulator 64 may disrupt the green beam by local phase modulation. It should be noted that components other than a dichroic mirror 62 may selectively divert the red and blue beams, and the red and blue beams may also be scanned upon the spatial light modulator 64 without the red and blue beams being disrupted.

In some embodiments, the dichroic mirror 62 and the spatial light modulator 64 may be slightly tilted so as to reflect the red, blue and green beams so that scanned optical signals 24*a-c* all converge at a point located near the scanning element 30. A projection lens 50 may then receive the reflected scanned optical signals 24*a-c* and project the scanned laser image onto a projection screen.

In another embodiment, the exemplary two dimensional spatial light modulator 64 illustrated in FIG. 5 may be configured as a one dimensional spatial light modulator. The one dimensional spatial light modulator (not shown) comprises pixels that correspond to one line of the scanned laser image. The scanning element 30 scans the optical signal 20 in one direction (e.g., vertically) upon the one dimensional spatial light modulator forming an image line. The one dimensional spatial light modulator may then scan and reflect the image line in a direction opposite to the scanning element (e.g., horizontally) to form a scanned laser image.

Other configurations to divert the optical signal 20 into two paths, and therefore two beam spots, are also possible. In another embodiment, the single polarization modulator 70 of FIG. 4 may be replaced with a two dimensional polarization modulator. Referring once again to FIG. 4, this two dimensional polarization modulator (not shown) may be positioned after the scanning element 30 so that the scanning element 30 scans or deviates the scanned optical signal 24*a*, 24*b* upon the two dimensional polarization modulator. Pixels of the two dimensional polarization modulator that correspond to portions of the scanned laser image having spatial frequencies that are below the spatial frequency threshold switch the phase of the scanned optical signal 24 that passes through these pixels. Conversely, pixels of the two dimensional polarization modulator that correspond to portions of the scanned laser image having spatial frequencies that are above the spatial frequency threshold are transparent and do not alter the polarization of the scanned optical signal that passes through the pixels. After passing through the two dimensional polarization modulator, the scanned optical signal 24 reaches the polarizing beam splitter 72, which diverts some light toward the passive optical element 80 and some light toward the projection surface, as described herein above (e.g., FIG. 4).

It is noted that terms like "commonly," "usually," and "typically," if utilized herein, should not be read to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "approximately" is utilized herein to represent the inherent degree of uncertainty that may be attributed to any quantitative comparison, value, measurement, or other representation. The terms "approximately" is also utilized herein to represent the degree by which a quantitative representation may vary from a stated reference without resulting in a change in the basic function of the subject matter at issue.

It is noted that recitations herein of a component of the present invention being "programmed" in a particular way, "configured" or "programmed" to embody a particular property, or function in a particular manner, are structural recitations as opposed to recitations of intended use. More specifically, the references herein to the manner in which a component is "programmed" or "configured" denotes an existing physical condition of the component and, as such, is to be taken as a definite recitation of the structural characteristics of the component.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A laser projection system comprising a system controller, a visible light source, and a light disrupting element, wherein the visible light source comprises at least one laser, and the laser projection system:

generates at least a portion of a scanned laser image by operating the laser for optical emission of encoded image data and controls a scanning element to scan an optical signal of the visible light source across a plurality of image pixels, wherein the scanned optical signal comprises a low spatial frequency beam and a high spatial frequency beam, and the low spatial frequency beam generates a low spatial frequency image having spatial frequencies below a spatial frequency threshold, the high spatial frequency beam generates a high spatial frequency image having spatial frequencies that are above the spatial frequency threshold, and the scanned laser image is a sum of the high spatial frequency image and the low spatial frequency image; and alters the low spatial frequency beam by directing and focusing the low spatial frequency beam upon an out of focus light disrupting element, wherein the light disrupting element is out of focus with respect to an intermediate image that is formed by scanning and focusing the low spatial frequency beam, and the low spatial frequency beam and the high spatial frequency beam are generated by a single laser and a beam splitting element.

2. A laser projection system comprising a system controller, a visible light source, and a light disrupting element, wherein the visible light source comprises at least one laser, and the laser projection system:

generates at least a portion of a scanned laser image by operating the laser for optical emission of encoded image data and controls a scanning element to scan an optical signal of the visible light source across a plurality of image pixels, wherein the scanned optical signal comprises a low spatial frequency beam and a high spatial frequency beam, and the low spatial frequency beam generates a low spatial frequency image having spatial frequencies below a spatial frequency threshold, the high spatial frequency beam generates a high spatial frequency image having spatial frequencies that are above the spatial frequency threshold, and the scanned laser image is a sum of the high spatial frequency image and the low spatial frequency image; and alters the low spatial frequency beam by directing and focusing the low spatial frequency beam upon an out of focus light disrupting element, wherein:
the light disrupting element is out of focus with respect to an intermediate image that is formed by scanning and focusing the low spatial frequency beam;
a low spatial frequency laser generates the low spatial frequency beam;
a high spatial frequency laser generates the high spatial frequency beam; and
the low spatial frequency laser and the high spatial frequency laser emit wavelengths that are approximately equal.

3. A laser projection system comprising a system controller, a visible light source, and a light disrupting element, wherein the visible light source comprises at least one laser, and the laser projection system:
generates at least a portion of a scanned laser image by operating the laser for optical emission of encoded image data and controls a scanning element to scan an optical signal of the visible light source across a plurality of image pixels, wherein the scanned optical signal comprises a low spatial frequency beam and a high spatial frequency beam, and the low spatial frequency beam generates a low spatial frequency image having spatial frequencies below a spatial frequency threshold, the high spatial frequency beam generates a high spatial frequency image having spatial frequencies that are above the spatial frequency threshold, and the scanned laser image is a sum of the high spatial frequency image and the low spatial frequency image; and
alters the low spatial frequency beam by directing and focusing the low spatial frequency beam upon an out of focus light disrupting element, wherein:
the light disrupting element is out of focus with respect to an intermediate image that is formed by scanning and focusing the low spatial frequency beam; and
the scanned optical signal comprises a blue beam, a red beam and a green beam, and only the green beam is split such that the low spatial frequency beam comprises a low frequency portion of the green beam and the high spatial frequency beam comprises the blue beam, the red beam and a high frequency portion of the green beam.

4. A laser projection system comprising a system controller, a visible light source, and a light disrupting element, wherein the visible light source comprises at least one laser, and the laser projection system:
generates at least a portion of a scanned laser image by operating the laser for optical emission of encoded image data and controls a scanning element to scan an optical signal of the visible light source across a plurality of image pixels, wherein the scanned optical signal comprises a low spatial frequency beam and a high spatial frequency beam, and the low spatial frequency beam generates a low spatial frequency image having spatial frequencies below a spatial frequency threshold, the high spatial frequency beam generates a high spatial frequency image having spatial frequencies that are above the spatial frequency threshold, and the scanned laser image is a sum of the high spatial frequency image and the low spatial frequency image; and
alters the low spatial frequency beam by directing and focusing the low spatial frequency beam upon an out of focus light disrupting element, wherein:
the light disrupting element is out of focus with respect to an intermediate image that is formed by scanning and focusing the low spatial frequency beam;
the light disrupting element comprises a passive optical element;
the laser projection system further comprises a polarization modulator positioned in a path of the optical signal such that the polarization modulator modulates the polarization of the optical signal between a first polarization state and a second polarization state, wherein the first and second polarization states are orthogonal; and
the laser projection system further comprises a polarizing beam splitter that splits the scanned optical signal into the low spatial frequency beam and the high spatial frequency beam, and directs the low spatial frequency beam toward the passive optical element and the high spatial frequency beam toward a projection surface, wherein the low spatial frequency has the first polarization state and the high spatial frequency has the second polarization state.

5. The laser projection system as claimed in claim 4 wherein:
the polarization modulator comprises a two dimensional polarization modulator positioned in the path of the optical signal after the scanning element;
the two dimensional polarization modulator further comprises a plurality of modulator pixels; and
the two dimensional polarization modulator locally modulates the polarization of the scanned optical signal as the optical signal is scanned across the two dimensional polarization modulator by switching the phase of individual modulator pixels that correspond to the low spatial frequency image.

6. The laser projection system as claimed in claim 4 wherein the polarization modulator comprises a single polarization modulator positioned in the path of the optical signal prior to the scanning element.

7. The laser projection system as claimed in claim 6 wherein:
the high spatial frequency beam comprises a red beam, a blue beam and a portion of a green beam that corresponds to the high spatial frequency image;
the low spatial frequency beam comprises a portion of the green beam that corresponds to the low spatial frequency image; and
the laser projection system further comprises a dichroic beam splitter such that the high spatial frequency beam is reflected by the dichroic beam splitter, and the low spatial frequency beam is reflected by the polarizing beam splitter as a function of polarization.

8. The laser projection system as claimed in claim 4 wherein:
the low spatial frequency beam is transmitted through the polarizing beam splitter and the high spatial frequency beam is reflected by the polarizing beam splitter;
the reflected high spatial frequency beam is reflected toward a projection surface;
the transmitted low spatial frequency beam is imaged by a lens toward the passive optical element; and
the passive optical element disrupts and reflects the transmitted low spatial frequency beam through the lens and toward the polarizing beam splitter.

9. The laser projection system as claimed in claim 4 wherein:
the high spatial frequency beam is transmitted through the polarizing beam splitter and the low spatial frequency beam is reflected by the polarizing beam splitter;
the transmitted high spatial frequency beam is directed toward a projection surface;

the reflected low spatial frequency beam is imaged by a lens toward the passive optical element; and the passive optical element disrupts and reflects the reflected low spatial frequency beam through the lens and toward the polarizing beam splitter.

10. The laser projection system as claimed in claim 4 wherein:

the low spatial frequency beam is directed toward the passive optical element through a lens such that the passive optical element disrupts and reflects the low spatial frequency beam;

the laser projection system further comprises a first quarter wave plate positioned between the passive optical element and the lens;

the first quarter wave plate rotates the polarization state of the low spatial frequency beam;

the low spatial frequency beam is transmitted through the lens toward the polarizing beam splitter;

the polarizing beam splitter reflects the low spatial frequency beam toward a second quarter plate that rotates the polarization of the low spatial frequency beam and reflects the low spatial frequency beam toward the polarizing beam splitter; and the low spatial frequency beam is transmitted through the polarizing beam splitter toward the projection surface.

11. The laser projection system as claimed in claim 4 wherein:

the low spatial frequency beam comprises a low spatial frequency power;

the high spatial frequency beam comprises a high spatial frequency power; and the laser projection system adjusts a ratio between the low spatial frequency power and the high spatial frequency power by adjusting a level of modulation provided by the polarization modulator.

12. A method of controlling a laser projection system comprising a visible light source and a light disrupting element, wherein the visible light source comprises at least one laser, and the method comprises:

generating at least a portion of a scanned laser image by configuring the at least one laser for optical emission of encoded image data and controlling a scanning element to scan an output beam of the visible light source across a plurality of image pixels, wherein the scanned optical signal comprises a low spatial frequency beam and a high spatial frequency beam, and the low spatial frequency beam generates a low spatial frequency image having spatial frequencies below a spatial frequency threshold and the high spatial frequency beam generates a high spatial frequency image having spatial frequencies that are above the spatial frequency threshold; and selectively disrupting the low spatial frequency beam by directing the low spatial frequency beam upon an out of focus light disrupting element, wherein the light disrupting element is out of focus with respect to an intermediate image that is formed by scanning and focusing the low spatial frequency beam.

13. The method of claim 12 wherein the light disrupting element comprises a spatial light modulator, a diffusing optical element or a diffracting optical element.

14. The method of claim 12 wherein the light disrupting element comprises a passive optical element, and the laser projection system directs the low spatial frequency beam toward the passive optical element, and directs the high spatial frequency beam away from the passive optical element.

15. The method of claim 14 wherein the passive optical element comprises a diffusing optical element or a diffracting optical element.

16. The method of in claim 12 wherein the light disrupting element comprises a spatial light modulator.

17. The method of claim 16 wherein the spatial light modulator is configured to selectively switch the phase of individual ones of the plurality of image pixels generated by the scanned optical signal and the spatial light modulator selectively switches the phase of individual ones of the plurality of image pixels that correspond to the low spatial frequency image.

18. The method of claim 16 wherein the spatial light modulator is configured to selectively disrupt individual ones of the plurality of image pixels generated by the scanned optical signal and the spatial light modulator selectively disrupts individual ones of the plurality of image pixels that correspond to the low spatial frequency image.

19. The method of claim 18 wherein the scanned optical signal comprises a red beam, a blue beam and a green beam, and the laser projection system further comprises:

a field lens that receives the scanned optical signal from the scanning element and corrects a field curvature associated with the scanned optical signal and the scanned laser image;

a dichroic mirror that reflects the red beam and the blue beam, and transmits the green beam toward the spatial light modulator; and a projection lens that projects the reflected red beam, the reflected blue beam and the reflected green beam onto a projection surface.

20. The method of claim 19 wherein the spatial light modulator disrupts the green beam by switching the phase of the green beam in the portions of the scanned laser image corresponding to the low spatial frequency image.

21. The method of claim 19 wherein the laser projection system further comprises a focusing lens that converges the red beam, blue beam and green beam of the scanned optical signal onto the scanning element.

22. The method of claim 19 wherein:

the dichroic mirror is positioned adjacent to the spatial light modulator; and the dichroic mirror and the spatial light modulator are tilted such that the red beam, blue beam and green beam converge at a position near the scanning element.

23. The method of claim 18 wherein:

the spatial light modulator comprises a one dimensional spatial light modulator and is configured to generate at least one line image;

the scanned optical signal illuminates the one dimensional spatial light modulator; and the one dimensional spatial light modulator reflects and scans the at least one line image across the projection surface to generate the scanned laser image.

24. The method of claim 18 wherein the laser projection system further comprises a two dimensional spatial light modulator comprising a plurality of phase modulating pixels.

* * * * *